United States Patent [19]
Cherry

[11] Patent Number: 6,010,900
[45] Date of Patent: Jan. 4, 2000

[54] METHOD OF INCREASING BIODEGRADATION OF SPARINGLY SOLUBLE VAPORS

[75] Inventor: Robert S. Cherry, Idaho Falls, Id.

[73] Assignee: Lockheed Idaho Technologies Company, Idaho Falls, Id.

[21] Appl. No.: 08/707,537

[22] Filed: Sep. 4, 1996

Related U.S. Application Data

[63] Continuation of application No. 08/353,482, Dec. 9, 1994, abandoned.

[51] Int. Cl.⁷ .................................. A61L 9/01; C02F 3/00
[52] U.S. Cl. ........................... 435/266; 435/264; 210/610
[58] Field of Search ................................... 435/41, 253.3, 435/259, 262, 262.5, 264, 266; 210/610, 611; 252/89.1

[56] References Cited

U.S. PATENT DOCUMENTS 5,316,940   5/1994   Georgiou ............................. 435/252.1

OTHER PUBLICATIONS

Tiehm A., Degradation of Polycyclic Aromatic . . . App & Environ Microbiol, Jan. 1994, pp. 258–263; vol. 60 No. 1.

*Primary Examiner*—Ralph Gitomer
*Attorney, Agent, or Firm*—Thorpe North & Western

[57] ABSTRACT

A method for increasing biodegradation of sparingly soluble volatile organic compounds (VOCs) in a bioreactor is disclosed. The method comprises dissolving in the aqueous phase of the bioreactor a water soluble, nontoxic, non-biodegradable polymer having a molecular weight of at least 500 and operable for decreasing the distribution coefficient of the VOCs. Polyoxyalkylene alkanols are preferred polymers. A method of increasing the growth rate of VOC-degrading microorganisms in the bioreactor and a method of increasing the solubility of sparingly soluble VOCs in aqueous solution are also disclosed.

36 Claims, 4 Drawing Sheets

METHOD OF INCREASING BIODEGRADATION OF SPARINGLY SOLUBLE VAPORS

This application is a continuation of U.S. application Ser. No. 08/353,482 filed Dec. 9, 1994 now abandoned, of Robert S. Cherry for METHOD OF INCREASING BIODEGRADATION OF SPARINGLY SOLUBLE VAPORS.

CONTRACTUAL ORIGIN OF THE INVENTION

The United States Government has rights in this invention disclosed under contract number DE-AC07-76ID01570 between the U.S. Department of Energy and EG&G Idaho, Inc., now contract number DE-AC07-94ID13223 with Lockheed Idaho Technologies Company.

BACKGROUND OF THE INVENTION

This invention relates to remediation of organic contaminants in gas and/or vapor streams. More particularly, the invention relates to biodegradation of volatile organic compounds in gas and/or vapor streams wherein the volatile organic compounds are sparingly soluble in aqueous solutions. Biodegradation is enhanced by decreasing the distribution coefficient, thus increasing the solubility, of sparingly soluble vapors in aqueous solution with a water soluble, non-toxic, inert polymer.

The remediation of air, soil, and water pollution has become an international priority. Around the globe, countries are instituting laws for protecting and cleaning the environment. Numerous technologies for reducing pollution and cleaning existing polluted sites are already known. One such technology that is gaining favor is bioremediation, i.e. the remediation of pollution by systems containing living organisms. The U.S. government, for example, has taken notice of bioremediation and has become a major source of funding for research and development thereof. In fiscal 1993, the U.S. Environmental Protection Agency budgeted $10 million, the Department of Defense budgeted $11 million, and the Department of Energy budgeted over $30 million for research and development of bioremediation technology. Bioremediation is advantageous when pollutant concentration in the waste gas is low. Moreover, the pollutants are converted to harmless oxidation products, e.g. $CO_2$ and $H_2O$, and the process can be carried out at low temperature and pressure.

Volatile organic compounds (VOCs) are produced by a variety of industries, including the chemical, fossil fuel, mining, manufacturing, agriculture, and food processing industries. Moreover, waste gases are also a product of remediation of soil and groundwater pollution wherein toxic organic vapors are extracted from subsurface soils and water. Such waste gases include, for example, gasoline vapors from vapor vacuum extraction (straight chain alkanes), ethylene from polyethylene manufacturing, and styrene from polystyrene manufacturing. Bioreactors are used to degrade a wide range of VOCs in waste gases. Three conventional bioreactors for treating waste gases are biofilters, trickling filters, and bioscrubbers. In biofilters and trickling filters, the gas passes through a filter bed to which bacteria residing in an aqueous phase are attached. In biofilters, the aqueous phase is stationary, whereas in trickling filters the aqueous phase is mobile. The water-soluble compounds in the gas are transferred to the liquid, from which they diffuse into the biolayer. In bioscrubbers, microorganisms are suspended in a moving aqueous phase. The contaminants are absorbed in a scrubber type of gas/liquid contactor where the culture medium containing the microorganisms is sprayed, and are subsequently degraded in an aerated stirred-tank reactor or "regenerator." These reactors have been used to degrade a wide range of water soluble gases. Degradation of sparingly soluble gases and vapors, however, has met with limited success.

Recently, two-phase systems have been proposed for biodegradation of poorly water soluble VOCs. In these systems, the VOC is transferred to a water-immiscible solvent that has a high affinity for the VOC. The VOC is contacted with the solvent in a gas absorber or trickle bed, and this VOC-rich solvent is then contacted with an aqueous bacterial suspension for degradation. M. T. Cesario et al., *Biological Treatment of Waste Gases Containing Poorly-Water-Soluble Pollutants*, in *Biotechniques for Air Pollution Abatement and Odour Control Policies* 135 (A. J. Dragt & J. van Ham eds., 1992); B. De Heyder et al., *Biotechnological Removal of Ethene from Waste Gases*, in *Biotechniques for Air Pollution Abatement and Odour Control Policies* 309 (A. J. Dragt & J. van Ham eds., 1992); S. El Alaam et al., *High Efficiency Styrene Biodegradation in a Biphasic Organic/Water Continuous Reactor*, 39 Appl. Microbiol. Biotechnol. 696 (1993). This method does not increase substrate availability in the aqueous phase and still requires transfer from the organic phase to the aqueous phase for degradation to occur.

Surfactants have been used to enhance the solubilization of long chain hydrocarbons and polycyclic aromatic hydrocarbons. S. J. Bury & C. A. Miller, *Effect of Micellar Solubilization on Biodegradation Rates of Hydrocarbons*, 27 Environ. Sci. Technol. 104 (1993), reported that the specific growth rate of certain bacterial strains and the degradation rates of n-decane can be significantly increased if straight-chain ethoxylated alcohols that are nonionic, nontoxic, readily biodegradable, and have very low critical micelle concentrations (CMCs) are added to the aqueous phase. A. Tiehm, *Degradation of Polycyclic Aromatic Hydrocarbons in the Presence of Synthetic Surfactants*, 60 Appl. Environ. Microbiol. 258 (1994), reported similar results for polycyclic aromatic hydrocarbons using polyethoxylated alcohols and polyethoxylated alkylphenol surfactants. These articles described use of surfactants to degrade liquid or solid phase pollutants, such as would be encountered in soil bioremediation. See also A. Oberbremer et al., *Effect of the Addition of Microbial Surfactants on Hydrocarbon Degradation in a Soil Population in a Stirred Reactor*, 32 Appl. Microbiol. Biotechnol. 485 (1990); W. F. Guerin & G. E. Jones, *Mineralization of Phenanthrene by a Mycobacterium* sp., 54 Appl. Environ. Microbiol. 937 (1988); D. E. Kile & C. T. Chiou, *Water Solubility Enhancements of DDT and Trichlorobenzene by Some Surfactants Below and Above the Critical Micelle Concentration*, 23 Environ. Sci. Technol. 832 (1989); K. D. Pennell et al., *Surfactant-Enhanced Solubilization of Residual Dodecane in Soil Columns*, 27 Environ. Sci Technol. 2332 (1993).

Surfactants have also been used to enhance the solubility of certain gases. A. D. King, Jr., *Solubilization of Gases by Polyethoxylated Nonyl Phenols*, 137 J. Colloid Interface Sci. 577 (1990), and A. D. King, Jr., *Solubilization of Gases by Polyethoxylated Lauryl Alcohols*, 148 J. Colloid Interface Sci. 142 (1992), disclosed that solubilities of oxygen, argon, methane, ethane, and propane in aqueous solutions of polyethoxylated nonyl phenols and polyethoxylated lauryl alcohols increase with surfactant concentration, as expected with micellar solubilization. The intramicellar solubility of each gas decreases as the mole ratio of ethylene oxide to nonyl phenol or mole ratio of ethylene oxide to lauryl alcohol increases. These results indicate that polymerized ethylene oxide groups do not contribute to the solubilization of these gases. Instead, the solubilizing capacities of the hydrophobic interiors of these micelles are found to closely approximate the bulk solubility of nonyl phenol or lauryl alcohol.

In view of the foregoing, it will be appreciated that a method of increasing biodegradation of sparingly soluble volatile organic compounds that contaminate gas streams or vapors would be a significant advancement in the art.

OBJECTS AND SUMMARY OF THE INVENTION

It is an object of the present invention to provide a method of increasing gaseous substrate availability in the aqueous phase of a bioreactor for degrading volatile organic compounds (VOCs) in waste gases.

It is also an object of the invention to provide a method of increasing the growth rate of a microorganism used for degrading VOCs in a bioreactor.

It is another object of the invention to provide a method of increasing the VOC degradation rate in a bioreactor.

It is still another object of the invention to provide a method of decreasing the distribution coefficient of VOCs in the aqueous phase of a bioreactor.

It is yet another object of the invention to provide a method of increasing the solubility of sparingly soluble VOCs in aqueous solution.

These and other objects are accomplished by providing a method of enhancing biodegradation of a sparingly soluble volatile organic compound in a bioreactor containing an aqueous phase in which a microorganism resides, comprising (a) dissolving in the aqueous phase an effective amount of a water soluble, non-toxic, inert polymer with a molecular weight of at least about 500, wherein the polymer decreases the distribution coefficient of the volatile organic compound, and (b) contacting the aqueous phase containing the dissolved polymer with the volatile organic compound. Preferably, the polymer has a molecular weight of at least about 1500 and comprises oxygen atoms and carbon atoms in a molar ratio in the range of about 1:2 to about 1:6, with hydrogen atoms as necessary to complete the structure. One class of preferred polymers comprises polyoxyalkylene alkanols having the formula:

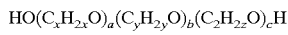

wherein x, y, and z are integers of 2 to 6 and a, b, and c are integers such that the molecular weight of the polymer is at least about 1500. More preferred are polyoxyalkylene alcohols having the formula:

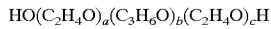

wherein a, b, and c are integers from 0 to about 200, with the proviso that if b is 0, then a+c is at least about 34, and if a+c is 0, then b is at least about 26. Another class of more preferred polyoxyalkylene alcohols has the formula:

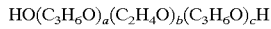

wherein a, b, and c are integers from 0 to about 200, with the proviso that if b is 0, then a+c is at least about 26, and if a+c is 0, then b is at least about 34.

A method of increasing the solubility of a sparingly soluble volatile organic compound in aqueous solution comprises (a) dissolving in the aqueous solution an effective amount of a water soluble, non-toxic, inert polymer with a molecular weight of at least about 500, wherein the polymer decreases the distribution coefficient of the volatile organic compound, and (b) contacting the aqueous solution containing the dissolved polymer with the volatile organic compound.

A method of increasing the growth rate of a volatile-organic-compound-degrading microorganism in the aqueous phase of a bioreactor is also disclosed. The method comprises enhancing biodegradation of a sparingly soluble volatile organic compound in the bioreactor by (a) dissolving in the aqueous phase an effective amount of a water soluble, non-toxic, inert polymer with a molecular weight of at least about 500, wherein the polymer decreases the distribution coefficient of the volatile organic compound, and (b) contacting the aqueous phase containing the dissolved polymer with the volatile organic compound.

DETAILED DESCRIPTION OF THE INVENTION

Figure 1:
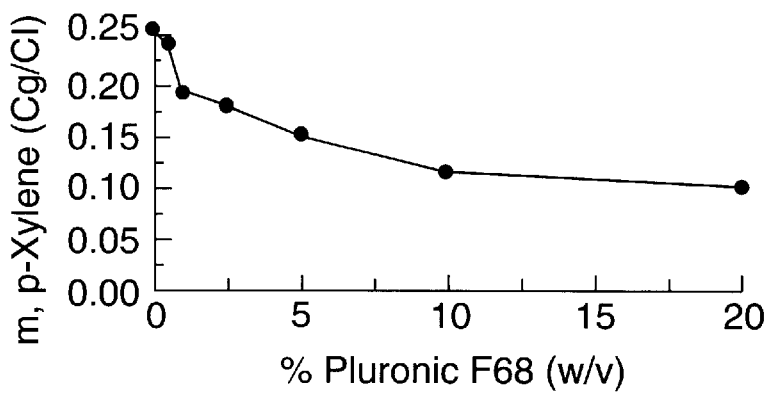
FIG. 1 shows the effect of a polyoxyalkylene alkanol (PF68) on the distribution coefficient for p-xylene.

Before the present method of enhancing biodegradation of a sparingly soluble volatile organic compound in a bioreactor is disclosed and described, it is to be understood that this invention is not limited to the particular process steps and materials disclosed herein as such process steps and materials may vary somewhat. It is also to be understood that the terminology used herein is used for the purpose of describing particular embodiments only and is not intended to be limiting since the scope of the present invention will be limited only by the appended claims and equivalents thereof.

It must be noted that, as used in this specification and the appended claims, the singular forms "a," "an," and "the" include plural referents unless the content clearly dictates otherwise. Thus, for example, reference to "a polymer" includes a mixture of two or more polymers, reference to "a volatile organic compound" includes reference to a mixture of two or more volatile organic compounds, and reference to "a microorganism" includes a mixture of two or more microorganisms.

In describing and claiming the present invention, the following terminology will be used in accordance with the definitions set out below.

As used herein, "polymer" means and includes homopolymers, copolymers including random copolymers, alternating copolymers, and block copolymers, and mixtures thereof and the like.

As used herein, "non-toxic" means not producing substantial harm or death to the microorganism of the bioreactor used for degrading volatile organic compounds. Thus, a non-toxic polymer is a polymer that does not substantially harm or cause death to a microorganism in a bioreactor so that the microorganism is not hindered in or prevented from biodegrading a volatile organic compound.

As used herein, "inert," "non-biodegradable," and similar terms mean that a polymer is not biodegraded at all or is degraded only very slowly by the microorganism of the bioreactor.

As used herein, "volatile organic compound" or "VOC" has the meaning as generally accepted in the art, is inclusive of a single compound, a mixture of compounds from the same class or mixtures of compounds from different classes and includes classes selected from the group consisting of aliphatic, alicyclic and aromatic hydrocarbons, chlorinated hydrocarbons, long-chain alcohols, aldehydes, ketones, ethers, esters, long-chain organic acids, and the like and mixtures thereof. The sulfur, i.e. thio, thiolo, thiono, etc., analogs (organosulfur compounds) of the respective alcohols, aldehydes, ketones, ethers and acids are deemed to be included in the above terminology. Illustrative of such volatile organic compounds are hydrocarbons, hydrocarbon blends and mixtures, such as petroleum products (gasoline, kerosene, diesel fuel, fuel oil, and the like); alkanes, such as propane, butane, hexane, heptane, octane, nonane, decane, and dodecane and the like along with the branched chained isomers thereof; alkenes such as ethylene, propylene, and the like; aromatic-containing hydrocarbons, such as benzene, toluene, the xylenes, styrene, naphthalene, anthracene, phenanthrene, and the like; chlorinated hydrocarbons such as vinyl chloride, methylene chloride, trichloroethylene and the like, etc. Similar examples could be given for other classes including the oxygen or sulfur containing organic compounds. However, enumeration of each VOC is not necessary in that the invention is limited only to the extent of what is functional within the framework of the claims. In other words, any sparingly soluble volatile organic compound having a decreased distribution coefficient in an aqueous phase attributable to the presence of the water soluble polymers described herein is within the scope of the invention as a VOC.

As used herein, "microorganism" means a minute living organism, usually microscopic, that is capable of degrading volatile organic compounds in a bioreactor. Preferred microorganisms include bacteria and fungi, such as Pseudomonas, Mycobacterium, etc.

As used herein, "effective amount" means an amount capable of providing a selected effect. Thus, an effective amount of a polymer in a method of enhancing biodegradation of sparingly soluble VOCs is an amount of polymer that provides the effect of increasing biodegradation of sparingly soluble VOCs in a bioreactor. An effective amount of a polymer in a method of increasing solubility of sparingly soluble VOCs in aqueous solution is an amount that provides the effect of increasing the solubility of such sparingly soluble VOCs in aqueous solution. An effective amount of a polymer in a method of increasing the growth rate of a microorganism in a bioreactor is an amount that provides the effect of increasing the growth rate of such a microorganism in a bioreactor. As will be explained below, it is thought that the polymer provides this effect by increasing the solubility of such volatile organic compounds in the aqueous phase of the bioreactor, thus making the volatile organic compounds more available to the microorganism for biodegradation. As used herein, "distribution coefficient" means the gas phase concentration divided by the liquid phase concentration after the gas and liquid phases are in thermodynamic equilibrium with each other. The polymer used in the present invention contains the functional characteristics of being water soluble, nontoxic, non-biodegradable, and operable for decreasing the distribution coefficient of volatile organic compounds in a bioreactor. In other words, the polymer is freely miscible with the aqueous phase of a bioreactor, is not toxic to the microorganism responsible for degrading volatile organic compounds that are solubilized in the aqueous phase, and is not metabolized or is metabolized only very slowly by the microorganism. If the polymer is metabolized at all, such metabolism should be slow enough that the solubilized volatile organic compounds are preferentially metabolized and thus degraded. Since a closed-loop bioreactor system is preferred, polymers that are easily degraded would have to be continuously supplied to function in such a system. Such biodegradable polymers may be preferentially metabolized over the volatile organic compounds. Absolute biodegradability must be balanced with toxic effects on microorganisms. Many surfactants that are non-biodegradable and increase the aqueous solubility of organic compounds are, nevertheless, toxic to microorganisms, A. Tiehm, supra, and thus unsuitable for use in bioreactors according to the present invention. In general, hydrophobicity of a surfactant is positively correlated with toxicity and ability to solubilize organic chemicals, A. Tiehm, supra. Nonionic surfactants of the alkylethoxylate form have been found to be toxic where the number of ethoxylate groups is in the range of 6 to 13. A. Tiehm, supra. The molecular weight of the polymer should be at least about 500 and preferably at least about 1500. The upper limit of the molecular weight of the polymer is limited only by functionality, i.e. solubility. These higher molecular weights, i.e. at least about 500, tend to render the polymer less biodegradable than lower molecular weight molecules. Further, the higher molecular weight also tends to cause less osmotic stress on the microorganism than results from lower molecular weight molecules at the same concentration by weight in the aqueous phase.

Water solubility is a result of the polymer containing many polar bonds, such as O—H and C—H bonds, making the polymer at least partially polar. Other types of polar bonds, such as C—S, C—N, S—H, and N—H, can also contribute to water solubility of the polymer, hence a polymer containing one or more of these bonds is also considered within the scope of the invention. The polymer can also have many carbon and hydrogen atoms, resulting in a partially nonpolar or hydrophobic character as well. The ratio of oxygen atoms to carbon atoms in the polymer is preferably in the range of about 1:2 to about 1:6.

Without wishing to be limited to any particular mode of action, the basis for the methods claimed herein is thought to stem from an interaction between the VOC molecule and the hydrophobic portion or portions of the polymer. The greater the amount of interaction between the VOC molecule and a hydrophobic portion of the polymer, the greater the solubility increase of the VOC and, hence, the greater the biodegradation thereof. This being the case, polymers can be selected for their ability to interact with particular VOCs. For example, materials such as hexane and xylene are relatively large and interact relatively well with the 2-carbon and 3-carbon hydrophobic portions of the polyoxyalkylene alkanol, PF68, as shown herein. Certain VOCs that are more hydrophobic or more volatile (e.g. $C_1$–$C_4$ alkanes) than hexane or xylene would be solubilized by polymers having moieties that are more hydrophobic than are present in PF68. Thus, lengthening the hydrophobic portion, e.g. using polybutylene oxide-containing polymers, and increasing the polymer concentration would increase the amount of interaction with such VOCs.

One preferred class of polymers that yields the desired characteristics of water solubility, nontoxicity, non-biodegradability, and operability in decreasing the distribution coefficient of volatile organic compounds is the polyoxyalkylene alkanols having the empirical formula:

$$HO(C_xH_{2x}O)_a(C_yH_{2y}O)_b(C_zH_{2z}O)_cH \quad \text{(Formula I)}$$

wherein x, y, and z are integers of 2 to 6 and a, b, and c are integers such that the molecular weight of the polymer is at least about 1500. Preferred polyoxyalkylene alkanols have the empirical formula:

$$HO(C_2H_4O)_a(C_3H_6O)_b(C_2H_4O)_cH \quad \text{(Formula II)}$$

wherein a, b, and c are integers of 0 to about 200, with the proviso that if b=0, then a+c is at least about 34, and if a+c=0, then b is at least about 26. Other preferred polyoxyalkylene alkanols have the empirical formula:

$$HO(C_3H_6O)_a(C_2H_4O)_b(C_3H_6O)_cH \quad \text{(Formula III)}$$

wherein a, b, and c are integers of 0 to about 200, with the proviso that if b=0, then a+c is at least about 26, and if a+c=0, then b is at least about 34.

Illustrative examples of these preferred polyoxyalkylene alkanols are the "PLURONIC" series of block copolymers. For example, "PLURONIC F68" (PF68) has a structure according to Formula II wherein a and c are about 75 and b is about 30. "PLURONIC PE6400" is also a suitable polymer having a structure according to Formula II wherein b is about 30 and a+c is about 28. "PLURONIC L-61" is another suitable polymer having a structure according to Formula II wherein b is an integer of 26 to 30 and a+c is an integer such that the polymer contains from 10 percent to 20 percent by weight of ethylene oxide. "PLURONIC L-60" is still another suitable polymer having a structure according to Formula II wherein b is an integer of 26 to 30 and a+c is zero so that the molecule is all polyoxypropylene.

Assuming Monod kinetics, the growth rate and the VOC degradation rate are dependent on the VOC concentration in the aqueous phase, S. P. Ottengraf, *Exhaust Gas Purification, in Biotechnology* (1986), as illustrated in the following equations:

$$\mu = \frac{\mu_{\max} C_L}{K_s + C_L} \quad \text{(Eq. 1)}$$

$$r_{VOC} = \frac{\mu}{Y_{x/s}} X \quad \text{(Eq. 2)}$$

where $\mu$=specific growth rate, $C_L$ is the VOC liquid concentration, $K_s$ is the Monod constant, $r_{VOC}$ is the VOC degradation rate, $Y_{x/s}$ is the biomass yield, and X is the biomass concentration. Defining the distribution coefficient as m=H/RT=$C_g$/$C_L$ (H is Henry's constant) and substituting m and Equation 1 into Equation 2 gives an expression for the VOC degradation rate (Equation 3).

$$r_{VOC} = \frac{\mu_{\max} C_g}{K_s m + C_g} \frac{1}{Y_{x/s}} X \quad \text{(Eq. 3)}$$

Equation 3 shows that the VOC degradation rate is inversely proportional to m ($r_{VOC}$~1/m) at low gas phase concentrations when $C_g$ is much less than $K_s$m. Such low concentrations are often encountered in practice, especially when the VOC is being removed essentially completely. Thus, if the distribution coefficient (m) is decreased, then the VOC degradation rate ($r_{VOC}$) can be increased. This would allow a higher conversion of poorly water soluble VOCs using in-place reactors or decrease the size of newly designed bioreactors required to eliminate the VOCs.

The present invention provides a method that is believed to decrease the distribution coefficient of VOCs, thus increasing the VOC degradation rate by microorganisms in bioreactors. The following examples are illustrative of the invention and are not intended to limit the scope of the invention.

EXAMPLE 1

Distribution coefficients were measured using a method similar to the EPICS (Equilibrium Partitioning in a Closed System) method of A. H. Lincoff & J. M. Gosset, *Gas Transfer at Water Surfaces* (1984); J. M. Gosset, *Measurements of Henry's Law Constant for C1 and C2 Chlorinated Hydrocarbons*, 21 Environ. Sci. Technol. 202 (1987), hereby incorporated by reference. Instead of measuring headspace concentration ratios from pairs of sealed bottles with different volumes of the same water/solvent, ratios were calculated for bottles with the same volume but with different solvents (one with water and the other with different PF68 concentrations).

Solutions of PF68 (Sigma Chemical Co., St. Louis, Mo.) were prepared using nanopure water. One hundred ml of these solutions were transferred to 120 ml serum bottles, thus $V_l$=100 ml and $V_g$=20 ml. The bottles were sealed with "TEFLON"-lined rubber or silicone septums and aluminum crimps. p-Xylene (5–'10 $\mu$) was then added to the bottles using a 10 $\mu$l Hamilton syringe (Hamilton Co., Reno, Nev.). The bottles were inverted and incubated at 30° C. with agitation on a shaker table at 200 rpm. After 24 hours, agitation was stopped, and the foam in the headspace was allowed to diminish before GC analysis was performed. Experiments were performed in duplicate and were replicated.

The following equations were used to estimate the distribution coefficient for p-xylene in equilibrium with PF68 solutions:

Performing a mass balance on the two serum bottles:

$$M_{control}=C_{g(control)}V_{g(control)}+C_{l(control)}V_{l(control)} \quad \text{(Eq. 4)}$$

$$M_{PF68}=C_{g(PF68)}V_{g(PF68)}+C_{l(PF68)}V_{l(PF68)} \quad \text{(Eq. 5)}$$

where $M_{Control}$ is the mass of VOC added to the water system;

$M_{PF68}$ is the mass of VOC added to the PF68 system;

$C_g$ is the gas phase concentration of VOC, mass/volume or peak area;

$C_l$ is the liquid phase concentration of VOC, mass/volume or peak area;

$V_g$ is the headspace volume; and $V_l$ is the liquid volume.

Assuming that $M_{control}=M_{PF68}$, $V_{g(control)}=V_{g(PF68)}$, $V_{l(control)}=V_{l(PF68)}$, and defining the distribution coefficients as $$m_{PF68} = \frac{C_{g(PF68)}}{C_{l(PF68)}}$$

and $$m_{control} = \frac{C_{g(control)}}{C_{l(control)}}$$

then the distribution coefficient, m, for PF68 can be written as $$m_{c(PF68)} = \frac{V_l}{C_{g(control)} / C_{g(PF68)} \left[ \left( V_g + \frac{V_l}{m_{control}} \right) - V_g \right]} \quad \text{(Eq. 6)}$$

The distribution coefficient for xylene in water ($m_{control}$) was estimated from vapor pressure and solubility data (note that m=H/RT) using the equations shown below.

$$H_{c(water)}=P_{vp}/S \quad \text{(Eq. 7)}$$

$$m_{control}=P_{vp}/S*1/RT \quad \text{(Eq. 8)}$$

Values for vapor pressure and solubility were taken from the Handbook of Chemistry and Physics (CRC 73d ed., Properties of Large Scale Production $$m_{control} = \frac{C_{g(control)}}{C_{l(control)}}$$

then the distribution coefficient, m, for PF68 can be written as $$m_{c(PF68)} = \frac{V_l}{C_{g(control)} / C_{g(PF68)} \left[ \left( V_g + \frac{V_l}{m_{control}} \right) - V_g \right]} \quad \text{(Eq. 6)}$$

The distribution coefficient for xylene in water ($m_{control}$) was estimated from vapor pressure and solubility data (note that m=H/RT) using the equations shown below.

$$H_{c(water)}=P_{vp}/S \quad \text{(Eq. 7)}$$

$$m_{control}=P_{vp}/S*1RT \quad \text{(Eq. 8)}$$

Values for vapor pressure and solubility were taken from the Handbook of Chemistry and Physics (CRC 73d ed., Properties of Large Scale Production and Priority Organic Pollutants, p. 16–22, 1992–1993). Henry's constant for p-xylene was calculated to be 0.006 (atm-m³/mole) and the distribution coefficient was 0.258. This value is consistent with Henry's Law constants reported by D. Mackay & W. Y. Shiu, A *Critical Review of Henry's Law Constants for Chemicals of Environmental Interest*, 10 J. Phys. Chem. Ref. Data 1175 (1981) ($H_c$(p-xylene)=0.0070±0.0024 atm-m³/mole), where $P_{vp}$ is the vapor pressure of xylene, atm; and S is the solubility of xylene in water, moles/M³.

Headspace concentrations in the equilibrium studies and the batch reactors were determined by GC analysis with a Hewlett Packard 5890 Series II GC. Samples (100 μl) were withdrawn and injected into the GC equipped with a Restek 30 m column (Rtx-5, 0.53 mm ID×3.0 μm film). The temperature program for xylene was an initial temperature of 80° C. for 1.0 min followed by an increase of 10° C./min until the temperature reached 100° C., where it was held for one minute. Helium was used as the carrier gas (40 ml/min) with a split ratio of 8.6:1.

FIG. 1 shows that the presence of PF68 lowered the distribution coefficient for xylene in aqueous solutions. For example, the distribution coefficient for p-xylene in 20% PF68 was about 2.5 times lower than in water.

EXAMPLE 2

The distribution coefficient of hexane in solutions of PF68 was determined by the procedure of Example 1. The Henry's constant for hexane was calculated to be 1.577 (atm-m³/mole), and the distribution coefficient was 63.44. This value is consistent with the Henry's Law constant of D. Mackay & W. Y. Shiu, supra ($H_c$(hexane)=1.678±0.247 atm-m³/mole). GC analysis for hexane was under isothermal conditions at 40° C.

Figure 2:
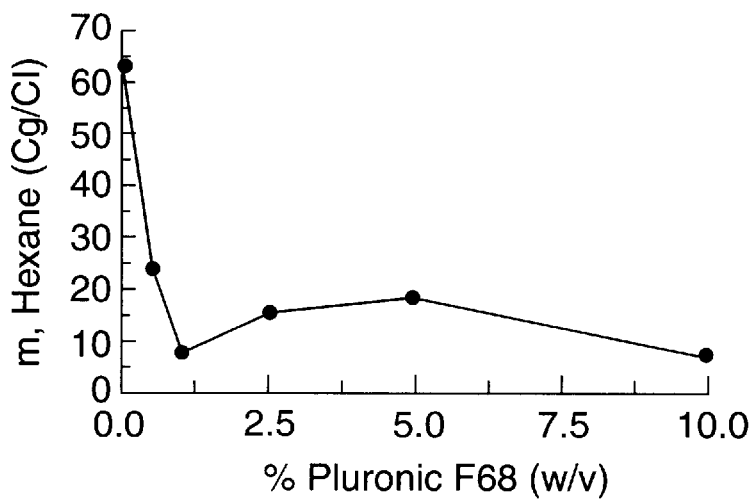
FIG. 2 shows the effect of a polyoxyalkylene alkanol (PF68) on the distribution coefficient for hexane.

FIG. 2 shows that PF68 decreased the distribution coefficient for hexane in aqueous solution. The distribution coefficient for hexane in PF68 was about 6 times lower than in water.

EXAMPLE 3

The effect of PF68 on the solubility of methane and propane was measured according the procedure of Example 1. No measurable increase in solubility of either methane or propane was observed. Methane and propane are both hydrophobic and highly volatile. For example, the boiling point of methane is −161.5° C. and the melting point is −183° C. It is believed that, due to their small size, hydrophobicity, and volatility, there was insufficient interaction between the hydrophobic portions of PF68 and these VOC molecules to measurably increase the solubility of either of them in aqueous solution. However, the selection of polymers having a more hydrophobic nature, e.g. polymers comprised of —($C_xH_{2x}O$)— monomers where x is an integer of 4 to 6, will provide for more interaction with such VOC molecules and increase the solubility thereof in aqueous solution.

EXAMPLE 4

Since PF68 increased the amount of hexane that partitioned into the aqueous phase, as shown in Example 2, it was believed that PF68 would increase substrate availability and lead to an increase in the growth rate of bacteria in a reactor. Batch degradation studies using aqueous suspensions of bacteria were performed as follows.

Mycobacterium ID-Y ("ID-Y") was selected to test degradation of hexane. ID-Y had previously been shown to grow on glucose, propane, butane, hexane, hexadecane, and methane. W. M. Reed & P. R. Dugan, *Isolation and Characterization of the Facultative Methylotroph Mycobacterium ID-Y*, 133 J. Gen. Microbiol. 1389 (1987). ID-Y was subcultured every 3–5 days on CM salts medium, T. L. Weaver & P. R. Dugan, *Ultrastructure of Methylosinus trichosporium as Revealed by Freeze Etching*, 121 J. Bacteriol. 704 (1975), hereby incorporated by reference, and 5% propane.

Batch degradation studies were performed by inoculating batch reactors with a 2-day culture of ID-Y. The batch reactors contained medium only or medium containing different concentrations of PF68. The reactors were 500 ml Erlenmeyer flasks (total volume of 530 ml) with a solvent reservoir inside the headspace of the flask. The liquid working volume was 50 ml with a nominal headspace volume of 480 ml. Solvent (0.2 ml) was added through a "TEFLON"-coated septum into the reservoir and allowed to completely vaporize. Emulsion formation did not occur in the systems, and a hexane layer did not form in the aqueous suspensions. The flasks also had a septum at the bottom for withdrawal of liquid samples. The reactors were incubated at 30° C. with agitation on a shaker table at 200 rpm.

In batch degradation experiments with low concentrations of hexane (0.001 to 0.4% by volume), cell growth was monitored by measuring optical density at 660 nm. The CM salts medium, PF68 solutions, and hexane did not interfere with these measurements at this wavelength. In experiments with a high concentration of hexane (4% by volume), emulsions that interfered with optical density measurements were formed. Therefore, in high concentrations of hexane, biomass was measured by total protein analysis using the Coomassie Blue Method, C. M. Stoscheck, *Increased Uniformity in the Response of the Coomassie Blue G Protein Assay to Different Proteins,* 184 Anal. Biochem. 111 (1990). PF68 did not interfere with this protein assay.

Figure 3:
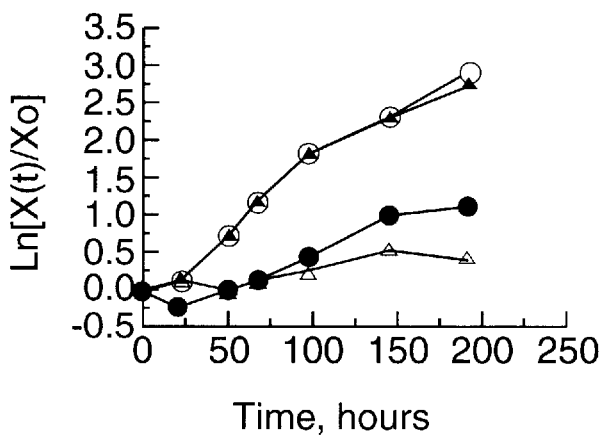
FIG. 3 shows the growth of Mycobacterium ID-Y on hexane vapors in the presence of a polyoxyalkylene alkanol (PF68): ●, medium without PF68; ○, 2.5% PF68; ▲, 5% PF68; Δ, 5% PF68 without hexane.
Figure 4:
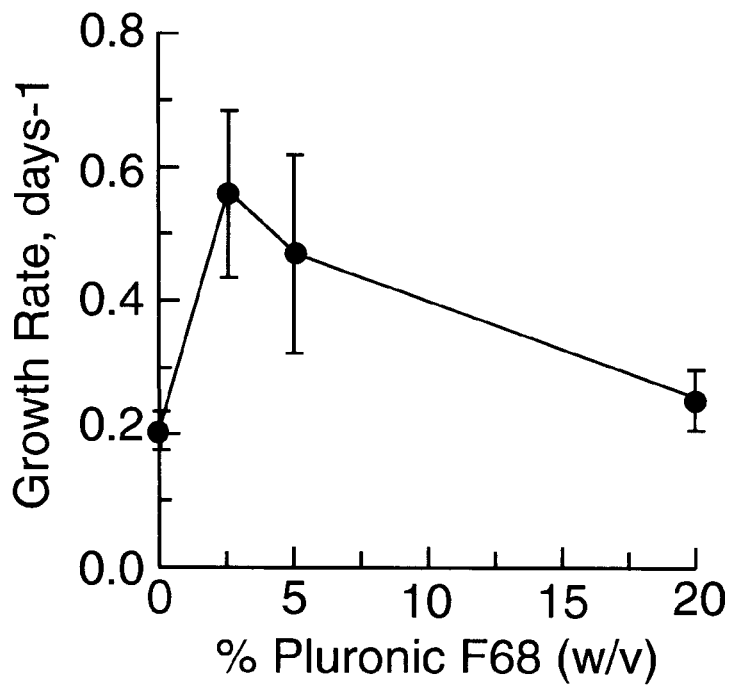
FIG. 4 shows the effect of a polyoxyalkylene alkanol (PF68) on the specific growth rate of ID-Y grown on hexane vapors.

FIG. 3 shows that PF68 significantly increased bacterial growth rates on hexane, as estimated by biomass formation. These data were used to determine the specific growth rate, wherein $\mu$, the slope of the log O.D. plot, was obtained from the exponential phase. FIG. 4 shows that a maximum specific growth rate of about 0.6 (days$^{-1}$) occurred between 2.5% and 5% PF68.

EXAMPLE 5

Figure 5:
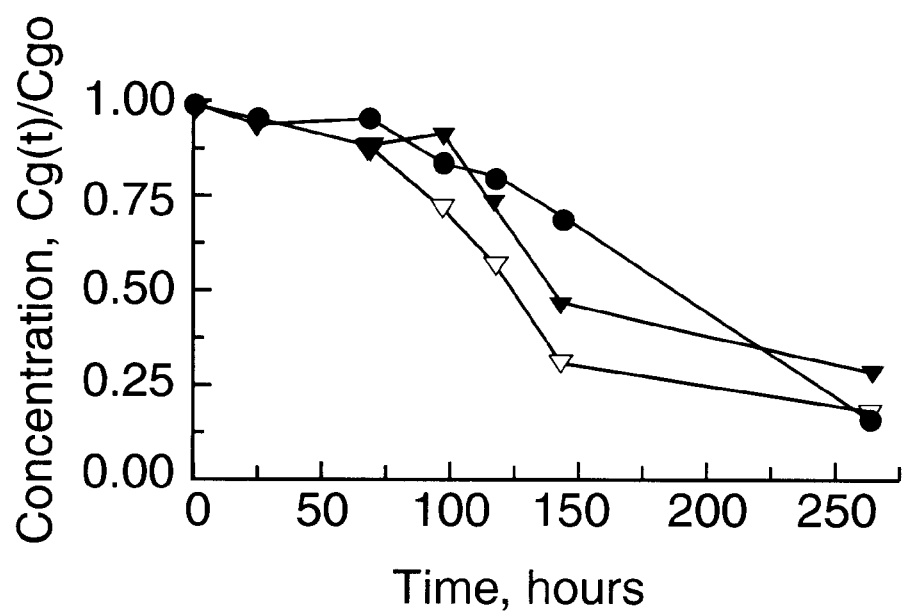
FIG. 5 shows the effect of a polyoxyalkylene alkanol (PF68) on degradation of hexane: ●, medium without PF68; ▽, 2.5% PF68; ▼, 5% PF68.

The gases in the headspace of the flasks of Example 4 were analyzed by GC to determine the rate of hexane disappearance. FIG. 5 shows there was an increase in the rate of hexane disappearance that corresponded with increase of bacterial growth rate in the presence of PF68.

EXAMPLE 6

The gases in the headspace of the flasks of Example 4 were analyzed by GC to determine the rate of $CO_2$ production. The rate of $CO_2$ production was faster in the flasks containing PF68 than in flasks without PF68. This is further evidence of increased substrate availability and bacterial growth due to the amount of hexane partitioned into the aqueous phase by the presence of PF68.

EXAMPLE 7

Figure 6:
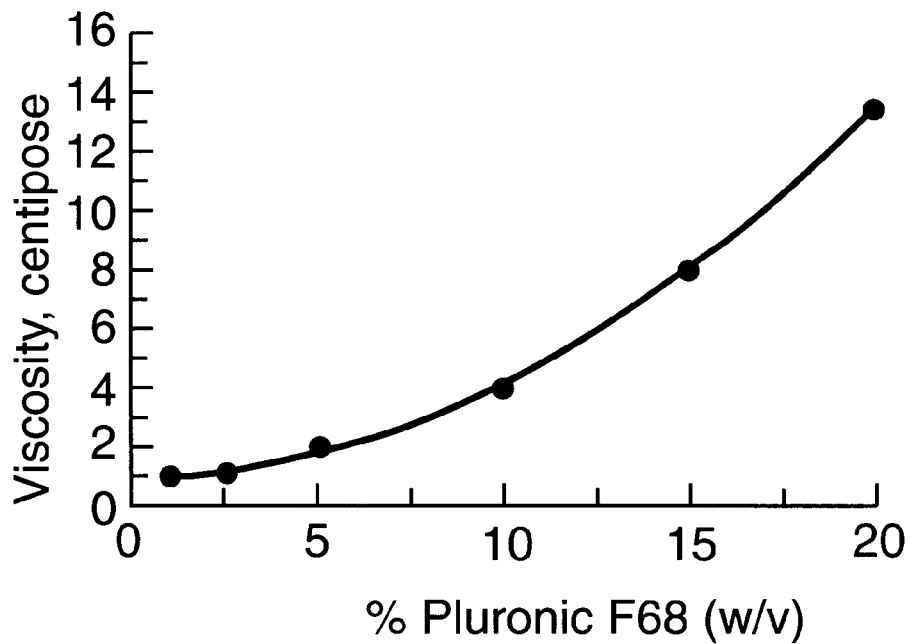
FIG. 6 shows the effect of a polyoxyalkylene alkanol (PF68) on solution viscosity.
Figure 7:
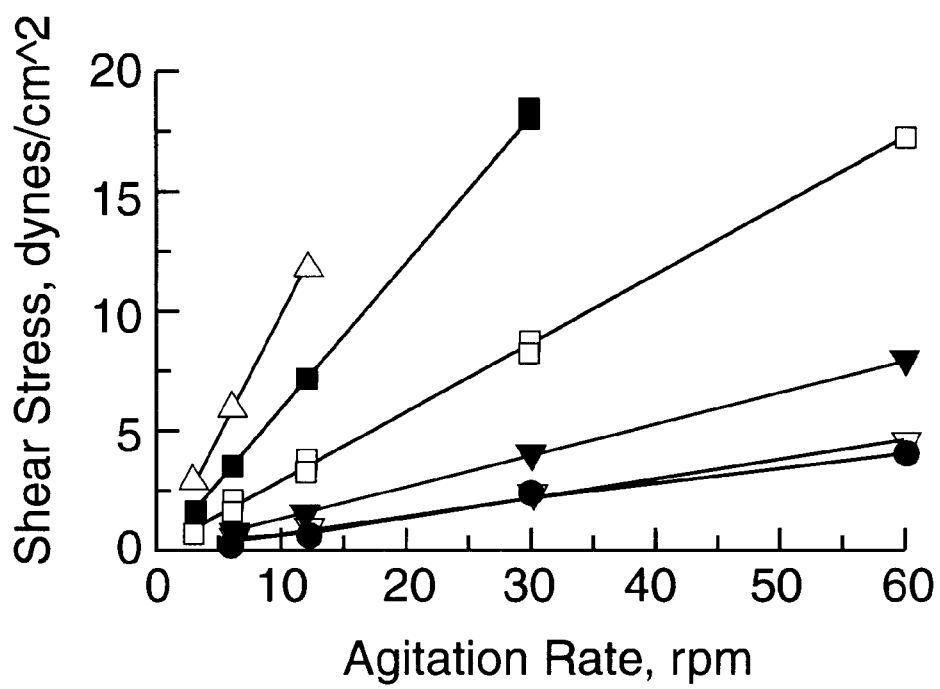
FIG. 7 shows the Newtonian nature of solutions containing a polyoxyalkylene alkanol (PF68): ●, 1% PF68; ▽, 2.5% PF68; ▼, 5% PF68; □, 10% PF68; ■, 15% PF68; Δ, 20% PF68.

The growth rates of bacteria in 20% PF68 (FIG. 4) were significantly lower than in 2.5% and 5% PF68. A Brookfield Digital Viscometer (Model DV-II) was used to measure the viscosity of the solutions. The viscometer was of the cone and plate type (Spindle CP-40) at 0.8°. Measurement were made with 0.5 ml samples at 25° C. FIG. 6 shows that the 20% PF68 solution was about 13 times more viscous than water. This is thought to account for the observed lower growth rate in 20% PF68. FIG. 7 shows that solutions of PF68 are Newtonian fluids since the slope of the shear stress versus shear rate plot (slope=viscosity) is constant at different levels of agitation. Thus, the viscosity of the PF68 solution could not be reduced by increased agitation. However, if the reduced biodegradation performance with 20% PF68 is caused by a mass transfer limitation because of the high viscosity, increased agitation would improve the mass transfer rate even if it did not alter the high viscosity.

EXAMPLE 8

Batch degradation of p-xylene was performed as in Example 4 with the exception that 500 ml serum bottles with "TEFLON"-lined silicone rubber septums were used as the reactors, and the microorganism used was *Pseudomonas putida* ATCC 23973, which has been reported to degrade toluene and p-xylene, J. Y Lee et al., *Simultaneous Biodegradation of Toluene and p-Xylene in a Novel Bioreactor: Experimental Results and Mathematical Analysis,* 9 Biotechnology Progress 46 (1993). This bacterium was maintained on the medium described in J. Y. Lee et al., supra, hereby incorporated by reference. Both liquid and gas samples were withdrawn through the septum. The liquid working volume was 50 ml. Xylene was added in small amounts such that no xylene layer was present nor did emulsions form in the PF68 solutions. The reactors were incubated at 30° C. with agitation on a shaker table at 250 rpm. Cell growth was monitored by optical density at 660 nm. The results were substantially similar to those of Example 4, i.e. the presence of PF68 in the growth medium in which xylene was the sole carbon source significantly increased bacterial growth rates as compared to media lacking PF68.

From these experiments with PF68, the range of effective amounts of PF68 is not clearly defined. At a concentration of 20% PF68 the biodegradation of VOCs is clearly enhanced as compared to systems lacking PF68. Growth rates of the bacteria are not optimal at this concentration, however, it is not presently known at what concentration of PF68 the presence of the polymer would cease to be effective. Preferred concentrations of PF68 are in the range of about 0.1% to about 20% by weight, and more preferred concentrations are in the range of about 1% to about 10% by weight.

EXAMPLE 9

Figure 8:
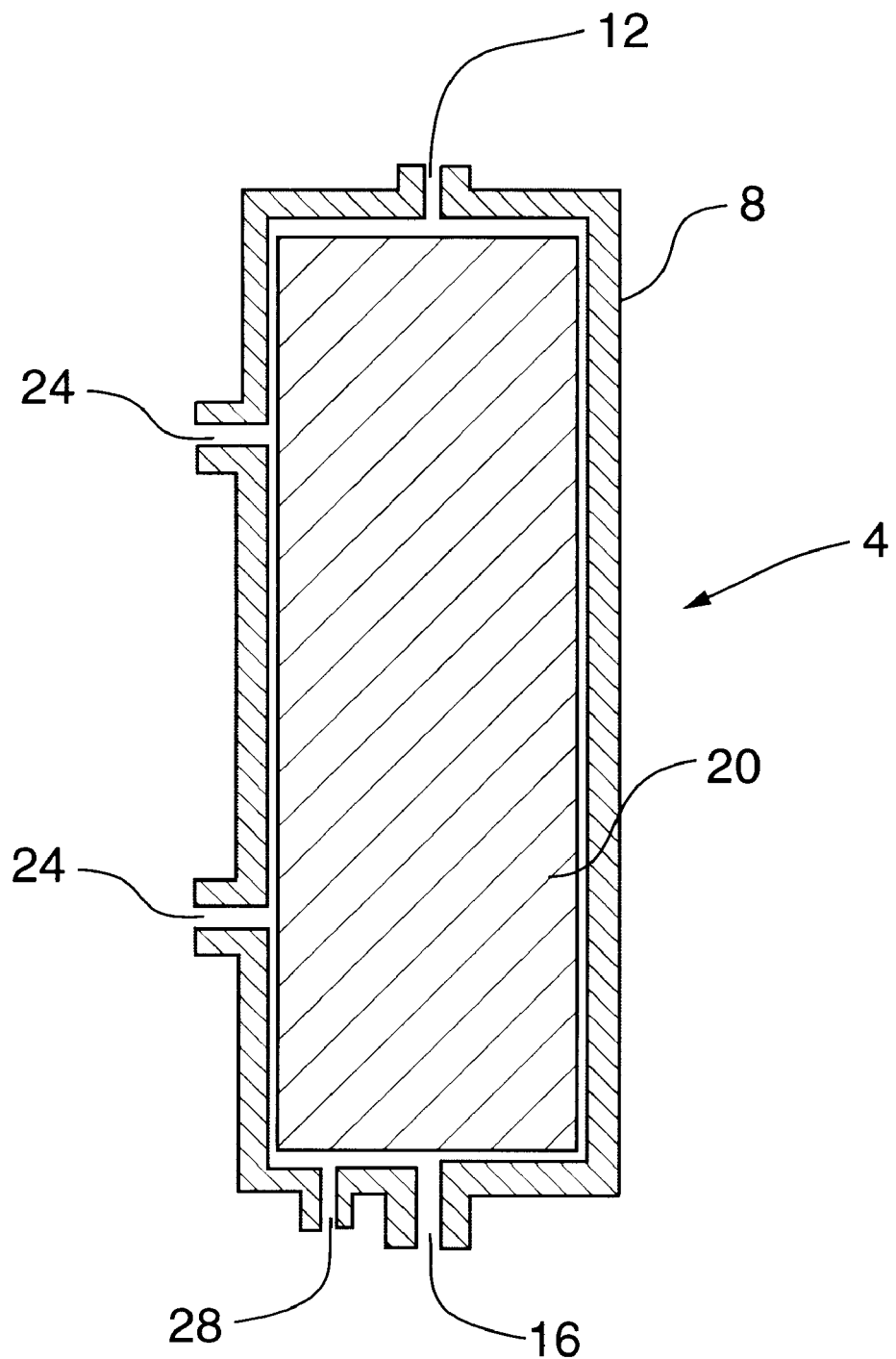
FIG. 8 shows a side sectional view of an illustrative embodiment of a bioreactor according to the present invention.

FIG. 8 shows an illustrative embodiment of a biofilter according to the present invention. The biofilter 4 comprises a housing 8 including an inlet opening 12 and an outlet opening 16. A VOC-containing gas stream from which the VOC is to be removed is conducted into the biofilter 4 through inlet 12 by means of a hose, pipe, or the like joined to the inlet 12 in a conventional manner. After passing through the biofilter 4, the gas stream with reduced VOC concentration exits through the outlet 16, which can also be joined to a hose, pipe, or the like, for venting to the atmosphere or for further treatment. The housing 8 is preferably composed of a substantially gas tight material and is constructed to minimize or prevent leakage of gases or vapors into or out of the biofilter 4. The housing is filled with a porous filter bed medium 20 containing an aqueous phase in which a microorganism operable for biodegrading the VOCs in the gas stream resides. The VOC-containing stream entering the biofilter 4 through the inlet 12 passes through the pores of the filter bed medium 20 so that the gas, including VOCs, comes into contact with aqueous phase containing the microorganism. The microorganism converts the VOCs into harmless products, principally carbon dioxide and water. These nontoxic products can then be removed from the biofilter 4. For convenience in operating the biofilter 4, one or more filling ports 24 are optionally constructed in the wall of the housing 8 for adding water, buffer, and the like to the filter bed medium 20 or removing gas samples for analysis. Further, one or more drain ports 28 are optionally constructed in the wall of the housing 8 for draining excess water or other liquids. Both the filling ports 24 and the drain ports 28 are sealable to keep the biofilter substantially gas tight when the ports are not in use. The filling ports 24 and the drain ports 28 can be opened when necessary, for example to take samples, add buffer, or drain excess liquid, and can be resealed.

A biofilter is constructed from glass process pipe (3 inches×12 inches) packed with 1.4 liter of a coniferous wood compost/wood chip bed medium. Such compost is obtainable from Schenectady County Soil and Water Conservation District (Scotia, N.Y.). Composts derived from other organic materials, such as leaves, grass clippings, and the like, and mixtures thereof, are also functional. These compost materials provide a porous support medium for the bacteria and allow a high rate of gas flow through the biofilter and gas exchange between the gas stream and the bacteria. Other types of ingredients can also be added to and mixed with the compost, including peat, clay, soil, wood chips, wood bark, and the like, and mixtures thereof.

I claim:

1. A method of enhancing biodegradation of a sparingly soluble volatile organic compound contained in a gas/vapor stream, wherein said sparingly soluble volatile organic compound is an aliphatic hydrocarbon, comprising:

(a) providing a bioreactor containing an aqueous phase in which a microorganism capable of degrading said sparingly soluble volatile organic compound resides;

(b) dissolving in said aqueous phase an effective amount of a water soluble, nontoxic, inert polymer to form a solution, said polymer comprising a polyoxyalkylene alkanol having the formula:

$$HO(C_xH_{2x}O)_a(C_yH_{2y}O)_b(C_zH_{2z}O)_cH$$

wherein x, y, and z are integers of 2 to 6 and a, b, and c are integers such that the molecular weight of the polymer is at least about 1500, wherein said polymer is capable of decreasing the distribution coefficient of said volatile organic compound;

(c) contacting the solution with a gas/vapor stream comprising said sparingly soluble volatile organic compound such that said sparingly soluble volatile organic compound is solubilized in said aqueous phase to form an enriched solution; and (d) incubating said enriched solution such that said microorganism degrades said solubilized sparingly soluble volatile organic compound thereby enhancing biodegradation of said sparingly soluble volatile organic compound.

2. The method of claim 1 wherein said polymer has the formula:

$$HO(C_2H_4O)_a(C_3H_6O)_b(C_2H_4O)_cH$$

wherein a, b, and c are integers from 0 to about 200, with the proviso that if b is 0, then a+c is at least 34, and if a+c is 0, then b is at least 26.

3. The method of claim 2 wherein a and c are about 75 and b is about 30.

4. The method of claim 3 wherein said effective amount is in the range of about 0.1% to 20% by weight of said aqueous phase.

5. The method of claim 4 wherein said effective amount is in the range of about 1% to 10% by weight of said aqueous phase.

6. The method of claim 1 wherein b is about 30 and a+c is about 28.

7. The method of claim 1 wherein b is about 26 to 30 and a+c is an integer such that the polymer contains from 0 to 20 percent by weight of —(C_2H_4O)— units.

8. The method of claim 1 wherein b is about 26 to 30 and a+c is an integer such that the polymer contains about 10 to 20 percent by weight of —(C_2H_4O)— units.

9. The method of claim 2 wherein b is about 26 to 30 and a+c is zero.

10. The method of claim 1 wherein said polymer has the formula:

$$HO(C_3H_6O)_a(C_2H_4O)_b(C_3H_6O)_cH$$

wherein a, b, and c are integers of 0 to about 200, with the proviso that if b=0, then a+c is at least about 26, and if a+c=0, then b is at least about 34.

11. The method of claim 1 wherein said bioreactor is selected from the group consisting of a biofilter, a trickling filter, and a bioscrubber.

12. The method of claim 11 wherein said bioreactor is a biofilter.

13. The method of claim 1 wherein said sparingly soluble volatile organic compound is a petroleum product.

14. The method of claim 13 wherein said petroleum product is selected from the group consisting of gasoline, kerosene, diesel fuel, fuel oil, and mixtures thereof.

15. The method of claim 1 wherein said sparingly soluble volatile organic compound is an alkane.

16. The method of claim 15 wherein said alkane is hexane.

17. The method of claim 1 wherein said sparingly soluble volatile organic compound is an alkene.

18. The method of claim 17 wherein said alkene is ethylene.

19. A method of increasing growth rate of a microorganism capable of degrading a sparingly soluble volatile organic compound solubilized in an aqueous phase of a bioreactor, wherein said sparingly soluble volatile organic compound is an aliphatic hydrocarbon, comprising (a) providing a bioreactor containing an aqueous phase in which a microorganism capable of degrading said sparingly soluble volatile organic compound resides;

(b) dissolving in said aqueous phase an effective amount of a water soluble, nontoxic, inert polymer to form a solution, said polymer comprising a polyoxyalkylene alkanol having the formula:

$$HO(C_xH_{2x}O)_a(C_yH_{2y}O)_b(C_zH_{2z}O)_cH$$

wherein x, y, and z are integers of 2 to 6 and a, b, and c are integers such that the molecular weight of the polymer is at least about 1500, wherein said polymer decreases the distribution coefficient of said volatile organic compound;

(c) contacting the solution with a gas/vapor stream comprising said sparingly soluble volatile organic compound such that said sparingly soluble volatile organic compound is solubilized in said aqueous phase to form an enriched solution; and (d) incubating said enriched solution such that said microorganism degrades said solubilized sparingly soluble volatile organic compound thereby increasing the growth rate of said microorganism.

20. The method of claim 19 wherein said polymer has the formula:

$$HO(C_2H_4O)_a(C_3H_6O)_b(C_2H_4O)_cH$$

wherein a, b, and c are integers from 0 to about 200, with the proviso that if b is 0, then a+c is at least about 34, and if a+c is 0, then b is at least about 26.

21. The method of claim 20 wherein a and c are about 75 and b is about 30.

22. The method of claim 21 wherein said effective amount is in the range of about 0.1% to 20% by weight of said aqueous phase.

23. The method of claim 22 wherein said effective amount is in the range of about 1% to 10% by weight of said aqueous phase.

24. The method of claim 20 wherein b is about 30 and a+c is about 28.

25. The method of claim 20 wherein b is about 26 to 30 and a+c is an integer such that the polymer contains from 0 to 20 percent by weight of —(C$_2$H$_4$O)— units.

26. The method of claim 20 wherein b is about 26 to 30 and a+c is an integer such that the polymer contains about 10 to 20 percent by weight of —(C$_2$H$_4$O)— units.

27. The method of claim 20 wherein b is about 26 to 30 and a+c is zero.

28. The method of claim 19 wherein said polymer has the formula:

$$HO(C_3H_6O)_a(C_2H_4O)_b(C_3H_6O)_cH$$

wherein a, b, and c are integers of 0 to about 200, with the proviso that if b=0, then a+c is at least about 26, and if a+c=0, then b is at least about 34.

29. The method of claim 19 wherein said bioreactor is selected from the group consisting of a biofilter, a trickling filter, and a bioscrubber.

30. The method of claim 29 wherein said bioreactor is a biofilter.

31. The method of claim 19 wherein said sparingly soluble volatile organic compound is a petroleum product.

32. The method of claim 31 wherein said petroleum product is selected from the group consisting of gasoline, kerosene, diesel fuel, fuel oil, and mixtures thereof.

33. The method of claim 19 wherein said sparingly soluble volatile organic compound is an alkane.

34. The method of claim 33 wherein said alkane is hexane.

35. The method of claim 19 wherein said sparingly soluble volatile organic compound is an alkene.

36. The method of claim 35 wherein said alkene is ethylene.

* * * * *